(12) United States Patent
Sato

(10) Patent No.: US 9,452,773 B2
(45) Date of Patent: Sep. 27, 2016

(54) POWER STEERING APPARATUS

(71) Applicant: Showa Corporation, Gyoda-shi (JP)

(72) Inventor: Kaduto Sato, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/547,750

(22) Filed: Nov. 19, 2014

(65) Prior Publication Data

US 2015/0266506 A1    Sep. 24, 2015

(30) Foreign Application Priority Data

Mar. 24, 2014 (JP) ................................. 2014-060577

(51) Int. Cl.
| | |
|---|---|
| B62D 7/22 | (2006.01) |
| B62D 5/04 | (2006.01) |
| F16H 55/24 | (2006.01) |
| F16H 57/021 | (2012.01) |

(52) U.S. Cl.
CPC ........... B62D 5/0421 (2013.01); B62D 5/0409 (2013.01); F16H 55/24 (2013.01); F16H 2057/0213 (2013.01)

(58) Field of Classification Search
CPC ... B62D 7/226; B62D 5/0421; B62D 5/0454
USPC ................................ 180/443, 444
See application file for complete search history.

(56) References Cited

U.S. PATENT DOCUMENTS

| | | | | |
|---|---|---|---|---|
| 6,634,103 | B2* | 10/2003 | Muraki et al. ............. | 29/898.07 |
| 7,213,677 | B2* | 5/2007 | Nakamura et al. ........... | 180/444 |
| 2001/0002630 | A1* | 6/2001 | Watanabe et al. ............ | 180/444 |
| 2003/0146039 | A1* | 8/2003 | Sano et al. .................... | 180/444 |
| 2006/0027417 | A1* | 2/2006 | Segawa ......................... | 180/444 |
| 2009/0255751 | A1* | 10/2009 | Kondo et al. ................. | 180/444 |
| 2009/0266640 | A1* | 10/2009 | Oshima et al. ............... | 180/444 |
| 2010/0243367 | A1* | 9/2010 | Suzuki et al. ................ | 180/444 |
| 2012/0061168 | A1* | 3/2012 | Hamakita et al. ............ | 180/444 |
| 2012/0272765 | A1* | 11/2012 | Fuechsel ............. | B62D 5/0409 74/416 |
| 2013/0075189 | A1* | 3/2013 | Sekikawa et al. ............ | 180/444 |
| 2013/0133974 | A1* | 5/2013 | Hamakita ............ | B62D 5/0403 180/444 |

FOREIGN PATENT DOCUMENTS

| | | |
|---|---|---|
| EP | 2689987 | 1/2014 |
| JP | 3646205 B | 2/2005 |
| KR | 2013-0107623 | 10/2013 |

OTHER PUBLICATIONS

U.K. Search Report mailed May 21, 2015 for the corresponding U.K. Application No. GB1420812.8.

* cited by examiner

*Primary Examiner* — Jacob Knutson
(74) *Attorney, Agent, or Firm* — Leason Ellis LLP

(57) ABSTRACT

An electric power steering apparatus includes: a worm gear; a worm wheel that is connected to the worm gear; a second bearing that rotatably supports the worm gear; a coil spring that biases the second bearing in a preload direction to push the worm gear against the worm wheel; a bearing case that supports the second bearing, and guides the movement of the second bearing along the preload direction; and a shock absorbing member that is provided at a location. The second bearing moves in an opposite direction of the preload direction to be brought into contact with the shock absorbing member at the location.

6 Claims, 11 Drawing Sheets

POWER STEERING APPARATUS

CROSS-REFERENCE TO RELATED APPLICATIONS

This application is based on and claims priority under 35 USC 119 from Japanese Patent Application No. 2014-060577 filed on Mar. 24, 2014, the entire content of which is incorporated herein by reference.

BACKGROUND

1. Technical Field

The present invention relates to a power steering apparatus.

2. Related Art

In an electric power steering apparatus for a vehicle, before the electric power steering apparatus is assembled together, the adjustment of a shaft-to-shaft distance between a worm gear and a worm wheel is required to be simply done without being affected by dimensional errors of components such as the worm gear. Even when the meshing of the worm gear and the worm wheel changes over time after the assembly, it is necessary to simply adjust the shaft-to-shaft distance, and thus eliminate backlash between the worm gear and the worm wheel.

For example, Patent Literature 1 (JP-B-3646205) discloses an electric power steering apparatus having preloading means by which a bearing supporting a tip shaft portion of the worm gear is biased in a predetermined preload direction in such a manner that a preload is exerted on a meshing portion between the worm gear and the worm wheel. Due to a biasing force exerted by the preloading means, the shaft-to-shaft distance between the worm gear and the worm wheel is adjusted, and backlash therebetween is eliminated.

SUMMARY OF THE INVENTION

In the configuration in which a preload is exerted on the meshing portion between the worm gear and the worm wheel, the bearing may receive a force in an opposite direction of a direction in which the preload is exerted, due to reaction to the meshing of the worm gear and the worm wheel. The bearing is expected to move and collide with other components, thereby generating noise, due to the reception of the force in the opposite direction.

An object of the present invention is to relieve an impact exerted on a bearing portion while ensuring the movement of the bearing portion along one direction.

According to an aspect of the present invention, a power steering apparatus includes a worm gear that receives a drive force to rotate; a worm wheel that is connected to the worm gear, and exerts a steering assistance force on a steering wheel; a bearing portion that rotatably supports the worm gear; a biasing portion that biases the bearing portion in one direction to push the worm gear against the worm wheel; a supporting portion that supports the bearing portion, and guides a movement of the bearing portion along the one direction; and a shock absorbing mechanism that is provided at a location, in which the bearing portion moves in an opposite direction of the one direction to be brought into contact with the shock absorbing mechanism at the location.

Here, the supporting portion may have a guiding surface that is a surface formed along the one direction, and guides the movement of the bearing portion along the one direction. The shock absorbing mechanism may have an elastic member having a modulus of elasticity greater than that of a part of the supporting portion forming the guiding surface.

The shock absorbing mechanism may be provided at a location other than a location at which the guiding surface is provided in the supporting portion.

The shock absorbing mechanisms may be respectively provided at positions in a circumferential direction of the bearing portion, which face each other while interposing the biasing portion therebetween.

Another shock absorbing mechanism may be provided at another location, in which the bearing portion moves in the one direction to be brought into contact with said another shock absorbing mechanism at said another location.

The supporting portion may have a cylindrical member, a portion of which is cut separate at a circumferential location opposite to the biasing portion, while a center of the bearing portion is interposed between the cut separate portion and the biasing portion. The shock absorbing mechanism may be provided at a location other than a location at which the cut separate portion of the supporting portion is positioned.

According to the aspect of the present invention, it is possible to relieve an impact exerted on the bearing portion while ensuring the movement of the bearing portion along one direction.

DETAILED DESCRIPTION OF THE INVENTION

Hereinafter, an embodiment of the present invention will be described with reference to the accompanying drawings.
Entire Configuration of Electric Power Steering Apparatus 1

Figure 1:
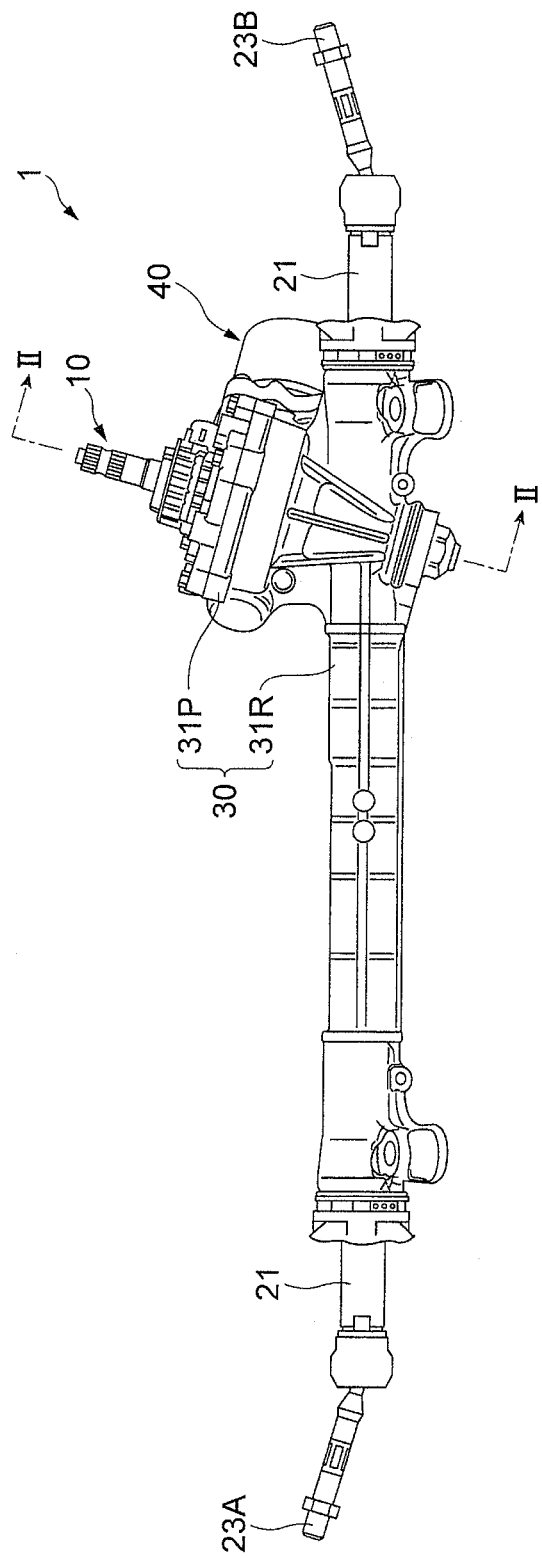
FIG. 1 is a schematic top view of an electric power steering apparatus.

FIG. 1 is a schematic top view of an electric power steering apparatus 1.

Figure 2:
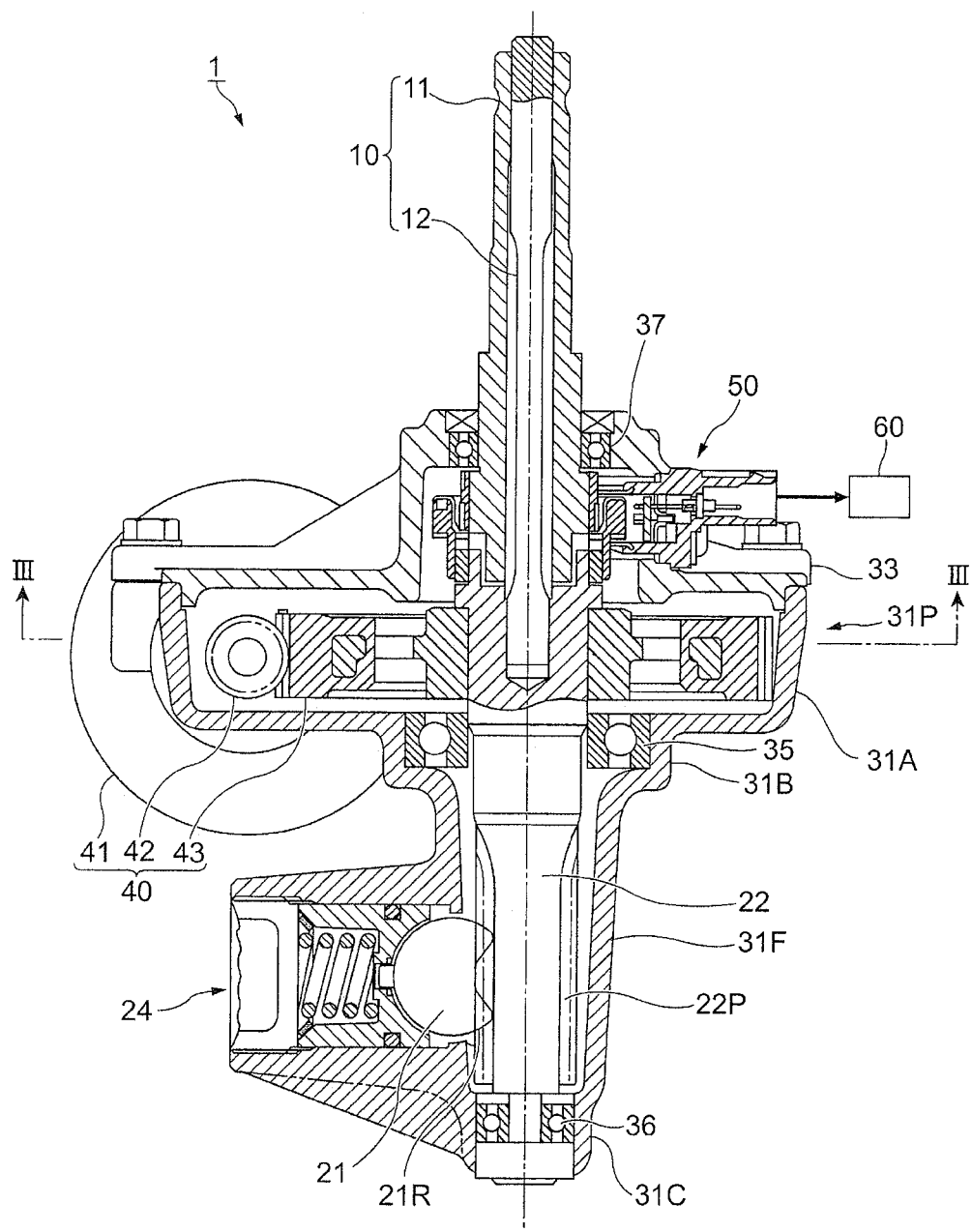
FIG. 2 is a cross-sectional view of the electric power steering apparatus illustrated in FIG. 1, taken along line II-II.

FIG. 2 is a cross-sectional view of the electric power steering apparatus 1 illustrated in FIG. 1, taken along line II-II.

The electric power steering apparatus 1 of the embodiment is a steering apparatus that arbitrarily changes a travelling direction of a vehicle, and the embodiment illustrates an example in which the electric power steering apparatus 1 is applied to particularly a motor vehicle. The electric power steering apparatus 1 of the embodiment is a so-called pinion assist type apparatus.

As illustrated in FIG. 1, the electric power steering apparatus 1 includes an input portion 10 to which a steering force is transmitted from a wheel-shaped steering wheel (not illustrated) which is turned by a driver; a rack shaft 21 that is connected to tires (not illustrated) to change an orientation of the tires; and a pinion shaft 22 (refer to FIG. 2) that receives torque from the input portion 10, and moves the rack shaft 21 in an axial direction.

In addition, the electric power steering apparatus 1 includes tie rods 23A and 23B that are respectively provided in opposite end portions of the rack shaft 21, and are respectively connected to the tires via knuckle arms (not illustrated); a housing 30 that accommodates various members; and an assisting portion 40 that exerts a steering assistance force on the pinion shaft 22.

As illustrated in FIG. 2, the electric power steering apparatus 1 includes a rack guide 24 that pushes the rack shaft 21 against the pinion shaft 22; a torque detecting device 50 that detects a steering torque of the steering wheel; and an electronic control unit (ECU) 60.

As illustrated in FIG. 2, the input portion 10 has an input shaft 11 to which a steering force is transmitted from the steering wheel turned by the driver, and a torsion bar 12 that is attached to the inside of the input shaft 11.

The rack shaft 21 is a long columnar member, and has a rack 21R provided with a plurality of teeth that line up in the axial direction. The rack shaft 21 is attached to the pinion shaft 22 while the rack 21R meshes with a pinion 22P (to be described later) of the pinion shaft 22. The rotation of the pinion shaft 22 causes the rack shaft 21 to move in the axial direction.

As illustrated in FIG. 2, the pinion shaft 22 is provided with the pinion 22P. As described above, the pinion 22P of the pinion shaft 22 is connected to the rack 21R of the rack shaft 21. The combination of the pinion shaft 22 and the rack shaft 21 converts a rotation force of the pinion shaft 22 into an axial movement of the rack shaft 21.

The pinion shaft 22 is connected to the torsion bar 12. Accordingly, the pinion shaft 22 receives a steering force from the input shaft 11 via the torsion bar 12, and thus the pinion shaft 22 rotates. In the embodiment, a worm wheel 43 (to be described later) of the assisting portion 40 is connected to the pinion shaft 22. Accordingly, the pinion shaft 22 receives a steering assistance force and a steering force from the assisting portion 40 and the input shaft 11, respectively, and thus the pinion shaft 22 rotates.

As illustrated in FIG. 1, the housing 30 includes a rack housing 31R that mainly accommodates the rack shaft 21, and a pinion housing 31P that mainly accommodates the pinion shaft 22 (refer to FIG. 2).

The rack housing 31R is a substantially cylindrical member that extends lengthwise in the axial direction, and is configured along the axial direction of the rack shaft 21. The rack housing 31R holds the rack shaft 21 via a bush which is not illustrated, and accommodates the rack shaft 21, while allowing the rack shaft 21 to be movable in the axial direction.

The pinion housing 31P has a substantially cylindrical outline. The pinion housing 31P is provided in such a manner that an axial direction of the pinion housing 31P intersects the axial direction of the rack housing 31R. As illustrated in FIG. 2, the pinion housing 31P rotatably holds the pinion shaft 22 via a first bearing 35 and a second bearing 36. A cover 33 is attached to an opening portion of the pinion housing 31P. The cover 33 rotatably holds the input shaft 11 via a third bearing 37.

In the example illustrated, the worm wheel 43, the first bearing 35, and the second bearing 36 are disposed in sequence from a center portion to an end portion in an axial direction of the pinion shaft 22. The pinion housing 31P includes a first outer circumferential portion 31A that accommodates the worm wheel 43 therein; a second outer circumferential portion 31B that accommodates the first bearing 35 therein; and a third outer circumferential portion 31C that accommodates the second bearing 36 therein.

As illustrated in FIG. 2, the assisting portion 40 includes an electric motor 41; a worm gear 42; and the worm wheel 43.

The electric motor 41 is controlled by the electronic control unit 60, and drives the worm gear 42 to rotate.

The worm gear 42 is connected to an output shaft 41A (refer to FIG. 3 to be described later) of the electric motor 41.

The worm wheel 43 is connected to the worm gear 42, and receives a drive force from the electric motor 41. Accordingly, a rotation of the electric motor 41 is reduced by the worm wheel 43, and the reduced rotation is transmitted t the pinion shaft 22.

The configuration of the assisting portion 40 will be described in detail later.

The torque detecting device 50 detects a steering torque of the steering wheel based on a relative angle between the input shaft 11 and the pinion shaft 22, in other words, based on the amount of torsion of the torsion bar 12. The steering torque detected by the torque detecting device 50 is sent to the electronic control unit 60.

The electronic control unit 60 has a CPU that performs various computational processes; a ROM that stores a program executed by the CPU, various data, and the like therein; and a RAM that is used as an operation memory or the like for the CPU. The electronic control unit 60 controls the drive of the electric motor 41 of the assisting portion 40 based on the steering torque acquired from the torque detecting device 50.

In the electric power steering apparatus 1 having the above-mentioned configuration, a steering torque exerted on the steering wheel is expressed as a relative rotation angle between the input shaft 11 and the pinion shaft 22, and thus the torque detecting device 50 detects the steering torque based on the relative rotation angle between the input shaft 11 and the pinion shaft 22. The electronic control unit 60 calculates the steering torque based on an output value from the torque detecting device 50, and controls the drive of the electric motor 41 based on the calculated steering torque.

The torque generated by the electric motor 41 is transmitted to the pinion shaft 22 via the worm gear 42 and the worm wheel 43. Accordingly, the torque generated by the electric motor 41 applies an assistance force to the steering force that the driver exerts on the steering wheel. That is, the pinion shaft 22 rotates due to the steering torque generated by the rotation of the steering wheel and the assisting torque exerted by the electric motor 41. In addition, the rotation of the pinion shaft 22 causes the rack shaft 21 to move in the axial direction and thus control the torque.

Detailed Configuration of Assisting Portion 40

Figure 3:
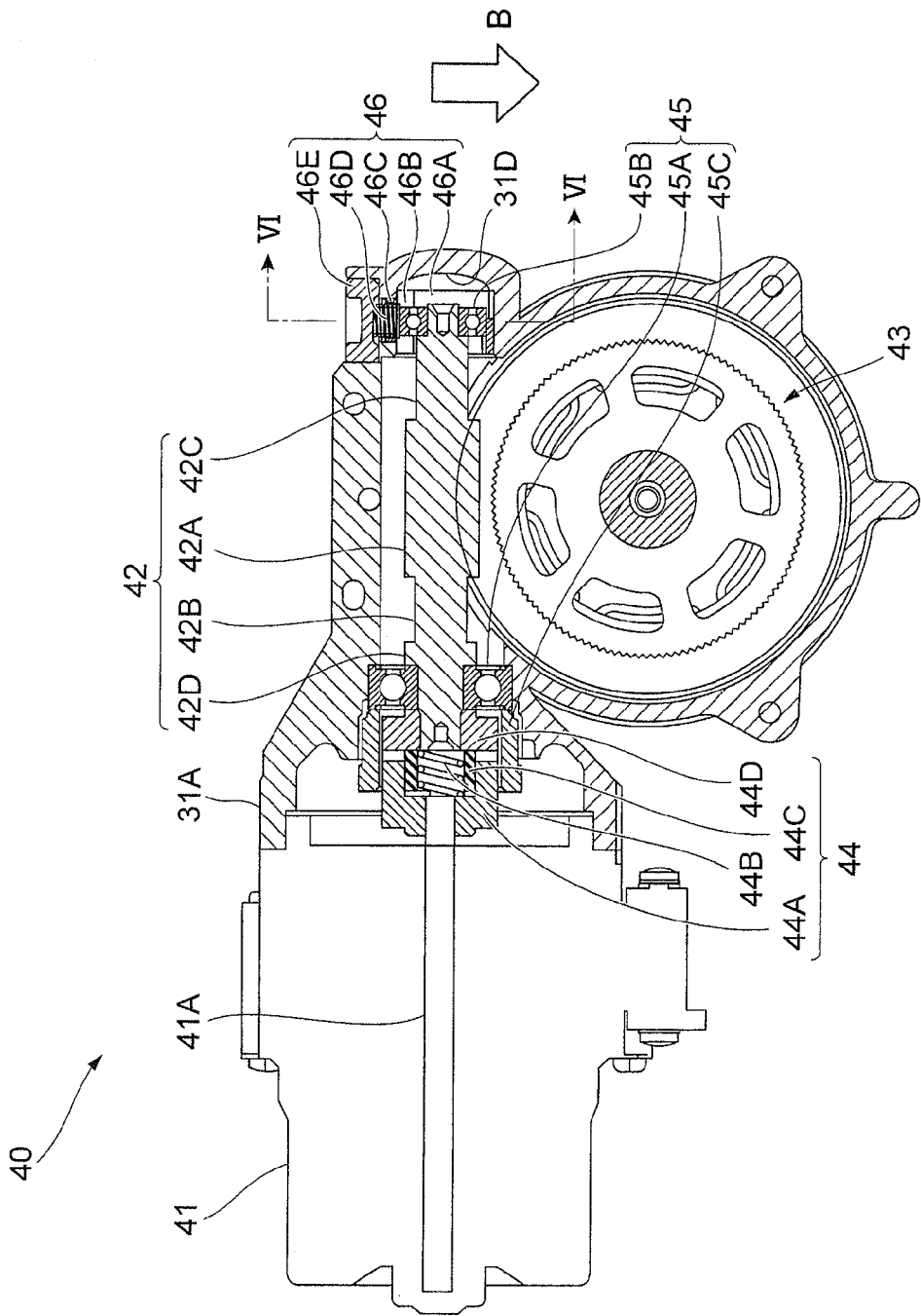
FIG. 3 is a cross-sectional view of the electric power steering apparatus illustrated in FIG. 2, taken along line III-III.
Figure 4:
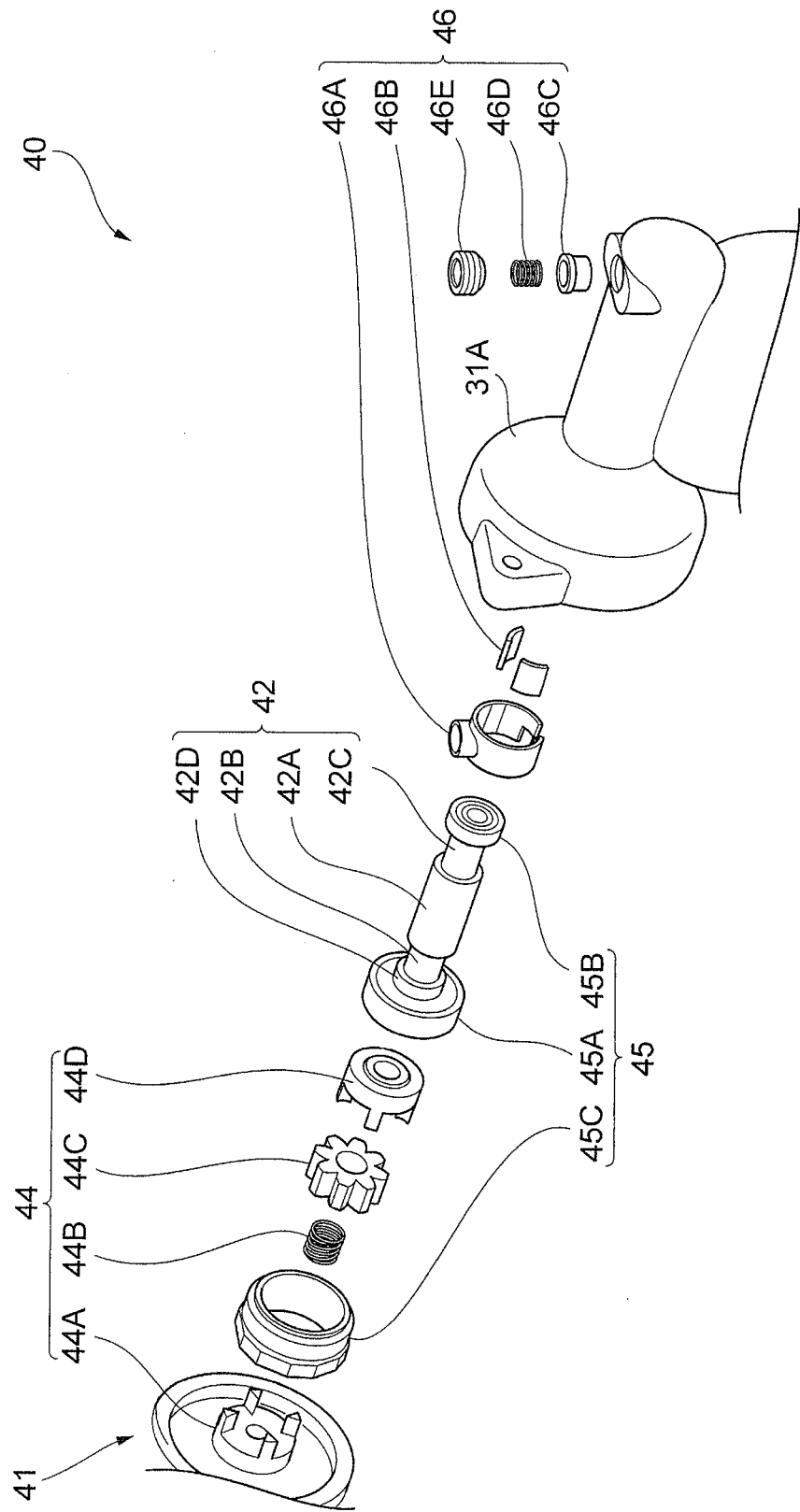
FIG. 4 is an exploded perspective view of the assisting portion.

FIG. 3 is a cross-sectional view of the electric power steering apparatus 1 illustrated in FIG. 2, taken along line FIG. 4 is an exploded perspective view of the assisting portion 40.

Figure 5:
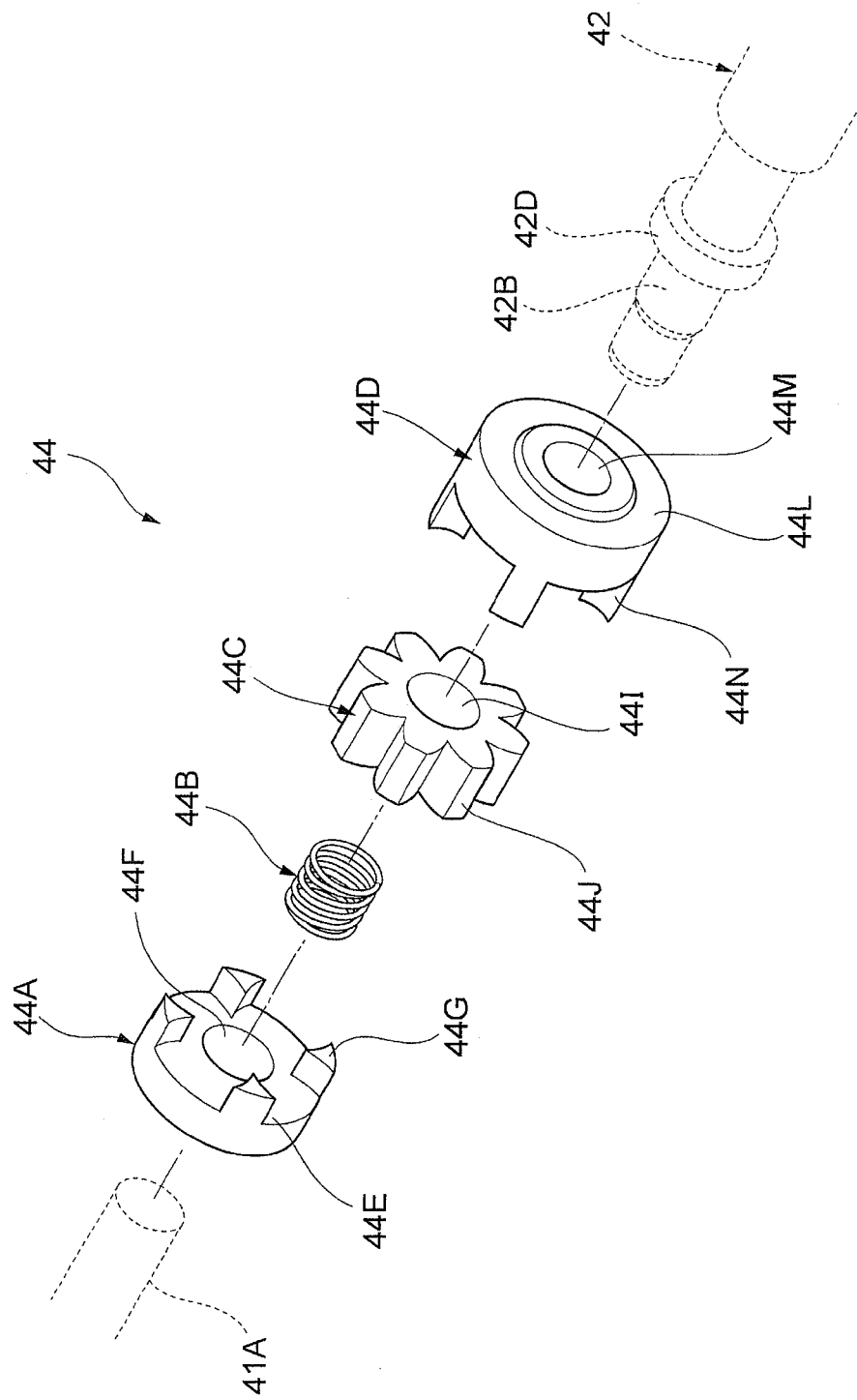
FIG. 5 is an exploded perspective view of a transmission mechanism.

FIG. 5 is an exploded perspective view of a transmission mechanism 44.

Subsequently, the configuration of the assisting portion 40 of the electric power steering apparatus 1 (refer to FIG. 1) will be described in detail with reference to FIGS. 3 to 5.

As described above, the assisting portion 40 includes the electric motor 41; the worm gear 42 that rotates due to the drive of the electric motor 41; and the worm wheel 43 that rotates while being connected to the worm gear 42.

The assisting portion 40 includes the transmission mechanism 44 that transmits the drive of the electric motor 41 to the worm gear 42; a supporting mechanism 45 that supports the worm gear 42; and a preload mechanism 46 that exerts a preload on a meshing portion between the worm gear 42 and the worm wheel 43. The preload mechanism 46 will be described later.

The electric motor 41 includes an output shaft 41A that receives a drive force and thus rotates. For example, the electric motor 41 is a three-phase brushless motor.

The worm gear 42 includes a teeth portion 42A; shaft portions 42B and 42C that are positioned on opposite sides of the teeth portion 42A, while interposing the teeth portion 42A therebetween; and a flange portion 42D that is provided in the shaft portion 42B.

The worm wheel 43 is connected to the teeth portion 42A of the worm gear 42, and is provided in a state of being fixed with respect to the pinion shaft 22.

As illustrated in FIG. 5, the transmission mechanism 44 includes a first coupling 44A; a coil spring 44B; an elastic coupling 44C; and a second coupling 44D.

Here, the first coupling 44A includes a main body 44E that is a substantially disc-shaped member; a pass-through hole 44F that is provided in a center portion of the main body 44E; and a plurality of wing portions 44G that are provided on an outer circumference of an end surface of the main body 44E so as to protrude from the end surface in an axial direction of the worm gear 42. The output shaft 41A is press fitted into the pass-through hole 44F, and thus the first coupling 44A is fixed with respect to the output shaft 41A.

The coil spring 44B is loaded between the first coupling 44A and the second coupling 44D, in a state of being compressed therebetween. The coil spring 44B is elastically deformed to absorb vibration occurring in the axial direction of the worm gear 42.

The elastic coupling 44C includes a pass-through hole 44I that is provided in a center portion of the elastic coupling 44C, and a plurality of protruding portions 44J that are radially formed on an outer circumference of the pass-through hole 44I. Here, the wing portions 44G of the first coupling 44A are disposed in such a manner that the wing portions 44G are respectively fitted into a part of a plurality of counter gaps formed between the protruding portions 44J adjacent to each other in a circumferential direction of the elastic coupling 44C. The elastic coupling 44C is made of an elastic member such as ethylene propylene rubber, and is elastically deformed to absorb vibration occurring in the axial direction of the worm gear 42.

The second coupling 44D includes a main body 44L that is a substantially disc-shaped member; a pass-through hole 44M that is provided in a center portion of the main body 44L; and a plurality of wing portions 44N that are provided on an outer circumference of an end surface of the main body 44L so as to protrude from the end surface in the axial direction of the worm gear 42. Here, the wing portions 44N of the second coupling 44D are disposed in such a manner that the wing portions 44G are respectively fitted into the counter gaps in which the wing portions 44G of the first coupling 44A are not disposed among the counter gaps formed between the protruding portions 44J adjacent to each other in the circumferential direction of the elastic coupling 44C. The shaft portion 42B of the worm gear 42 is press fitted into the pass-through hole 44M, and thus the second coupling 44D is fixed with respect to the worm gear 42.

Subsequently, the supporting mechanism 45 will be described with reference to FIGS. 3 and 4 again. The supporting mechanism 45 includes a first bearing 45A; a second bearing (a bearing portion) 45B; and a bearing nut 45C.

Here, an outer ring of the first bearing 45A is fixed to a first outer circumferential portion 31A, and an inner ring is press fitted onto the shaft portion 42B of the worm gear 42, and thus the first bearing 45A is fixed with respect to the worm gear 42. In the example illustrated, the first bearing 45A is disposed in a state of being interposed between the flange portion 42D of the shaft portion 42B and the second coupling 44D.

An outer ring of the second bearing 45B is supported by a bearing case 46A (to be described later), and an inner ring is press fitted onto the shaft portion 42C of the worm gear 42, and thus the second bearing 45B is fixed with respect to the worm gear 42.

The bearing nut 45C is fixed to the first outer circumferential portion 31A, while being screwed onto the first outer circumferential portion 31A. The bearing nut 45C holds the outer ring of the first bearing 45A. That is, the outer ring of the first bearing 45A is fixed to the first outer circumferential portion 31A via the bearing nut 45C.

Detailed Configuration of Preload Mechanism 46

Figure 6:
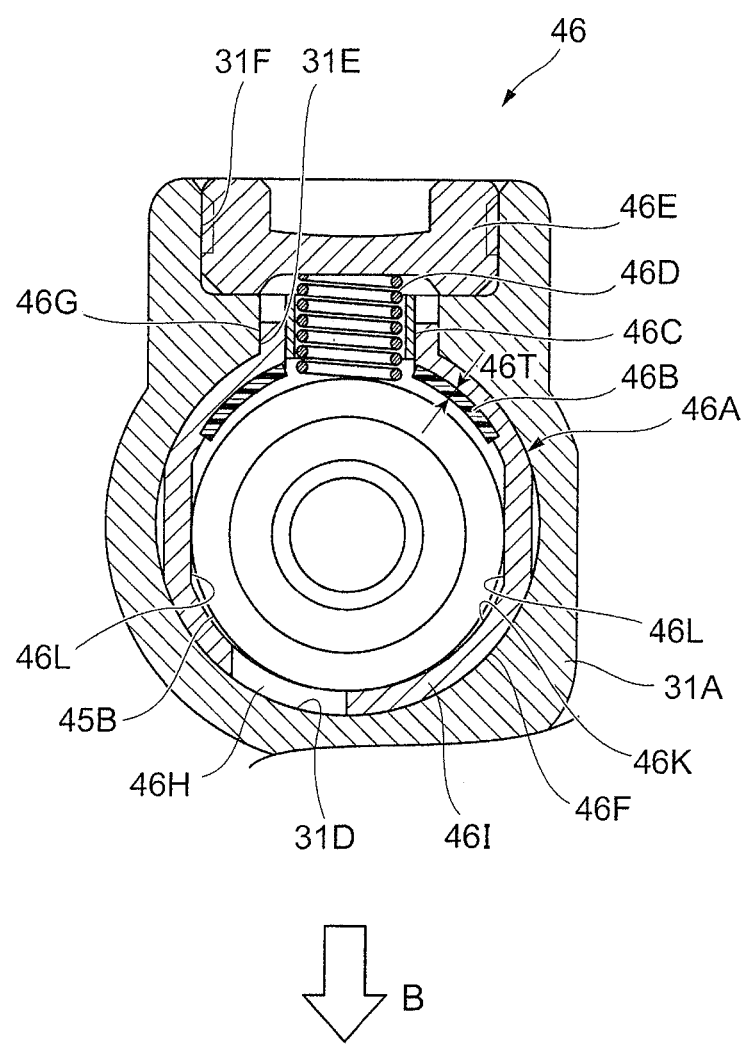
FIG. 6 is a cross-sectional view of a preload mechanism illustrated in FIG. 3, taken along line VI-VI.

FIG. 6 is a cross-sectional view of the preload mechanism 46 illustrated in FIG. 3, taken along line VI-VI.

Figure 7A:
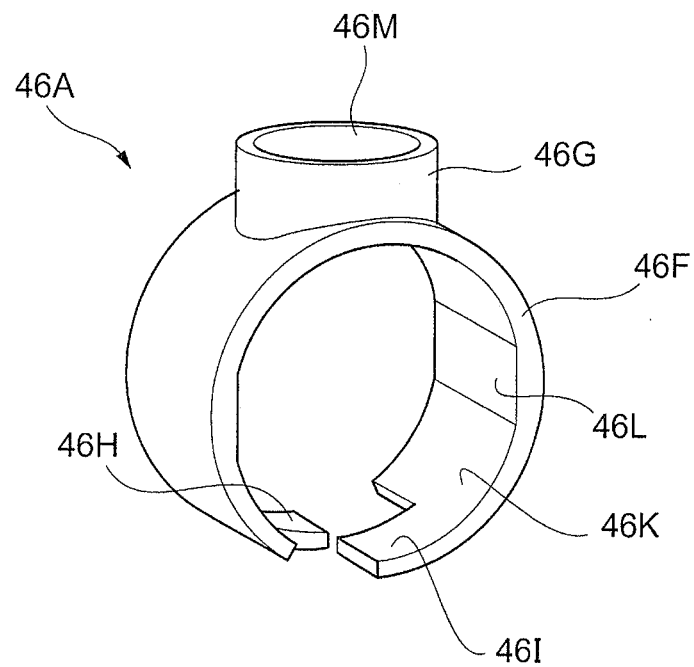
FIG. 7A is a perspective view of a bearing case.
Figure 7B:
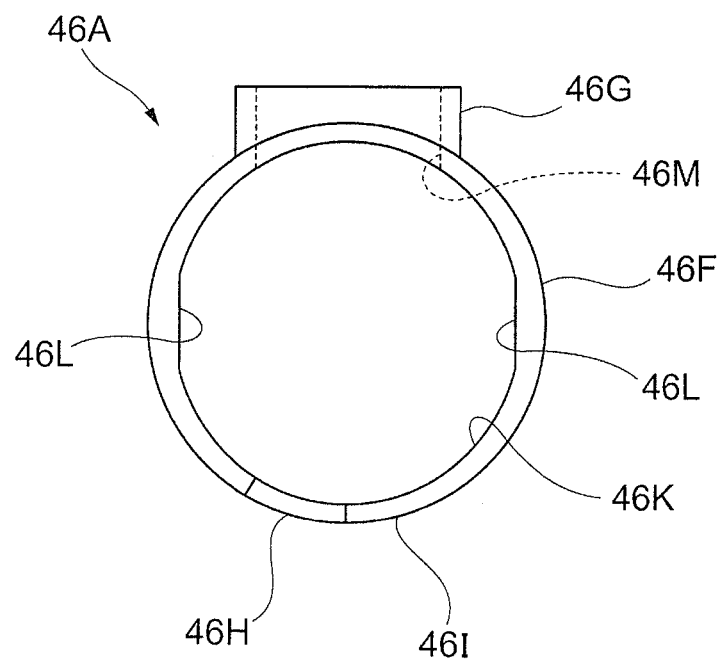
FIG. 7B is a front view of the bearing case.

FIG. 7A is a perspective view of the bearing case 46A, and FIG. 7B is a front view of the bearing case 46A.

Figure 8A:
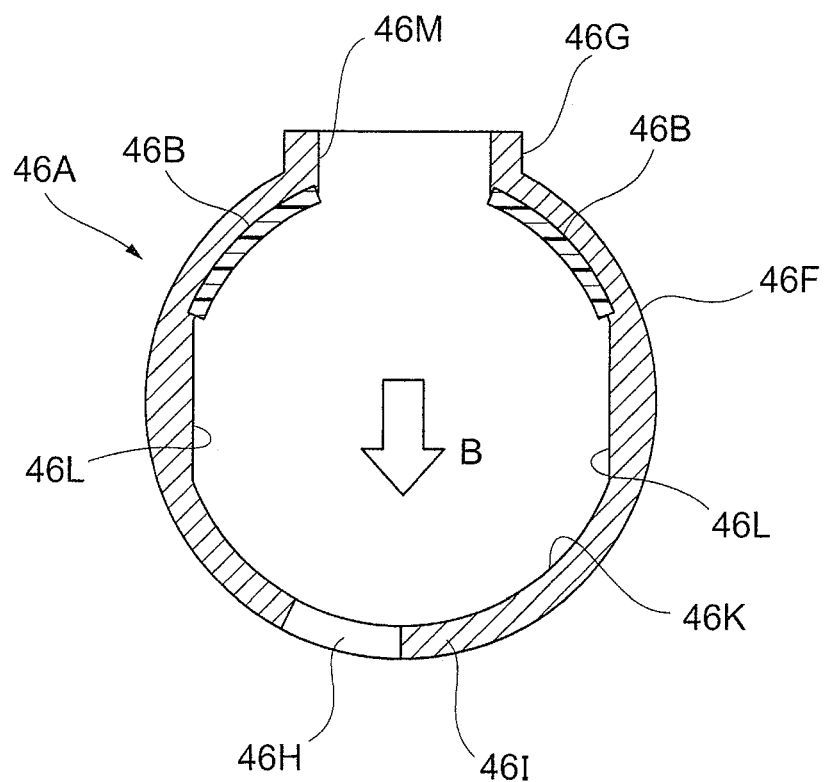
FIG. 8A is a front view of the bearing case and shock absorbing members.
Figure 8B:
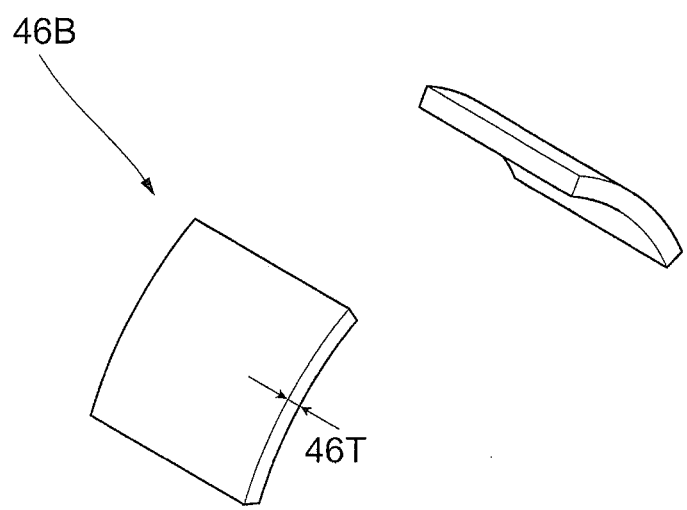
FIG. 8B is a perspective view of the shock absorbing members.

FIG. 8A is a front view of the bearing case 46A and shock absorbing members 46B, and FIG. 8B is a perspective view of the shock absorbing members 46B.

Subsequently, the configuration of the preload mechanism 46 will be described in detail with reference to FIGS. 4 to 8B.

The preload mechanism 46 includes the bearing case 46A that is an example of a supporting portion; the shock absorbing members 46B that is an example of a shock absorbing mechanism; a cylindrical member 46C; a coil spring 46D that is an example of a biasing portion; and a cap 46E.

As illustrated in FIGS. 7A and 7B, the bearing case 46A is an oilless bush that is made of synthetic resin such as oil-impregnated polyacetal resin. The bearing case 46A includes a main body 46F that is a substantially annular body having a substantially C shape, a portion of which is cut separate at one location (a location which is opposite to the coil spring 46D, and at which the center of the second bearing 45B is interposed between the coil spring 46D and the main body 46F) in a circumferential direction of the main body 46F; and a cylindrical protruding portion 46G having a substantially cylindrical shape which protrudes radially outwards from an outer circumference of the main body 46F at the one location in the circumferential direction.

The bearing case 46A includes protruding pieces 46H and 46I. The protruding piece 46H is one of end portions of the main body 46F that is cut separate into a C shape, which mates with the other end in the circumferential direction, and is provided on one end surface in an axial direction of the main body 46F. The protruding piece 46I is the other end portion, and is provided on the other end surface in the axial direction of the main body 46F.

The bearing case 46A includes two flat guiding surfaces 46L that are portions of an inner circumferential surface 46K of the main body 46F, and are respectively provided at positions which face each other and interpose a center axis of the main body 46F therebetween. The bearing case 46A includes a spring pass-through hole 46M that passes through the bearing case 46A so as to connect respective inner portions of the main body 46F and the cylindrical protruding portion 46G to the outside.

When the bearing case 46A receives an external force, the bearing case 46A is cut separate into a C shape, thereby changing a distance between the end portions mating each other in the circumferential direction, and changing the diameter in size of the bearing case 46A. When the bearing case 46A has a diameter smaller (in a diameter reduced state) compared to when the bearing case 46A does not receive an external force (in a free load state), the bearing case 46A is set in such a manner that the protruding pieces 46H and 46I can line up with each other in a given range in the circumferential direction. The bearing case 46A in a free load state has an inner diameter greater than the outer diameter of the second bearing 45B.

Subsequently, the shock absorbing member 46B will be described.

As illustrated in FIGS. 8A and 8B, the shock absorbing members 46B are thin plate-like members that are provided along the inner circumferential surface 46K of the bearing case 46A. Each of the shock absorbing members 46B is made of a member (an elastic member) having a modulus of elasticity (an elastic force) greater than that of the main body 46F of the bearing case 46A, and more specifically, that of a part forming the guiding surface 46L or the inner circumferential surface 46K of the main body 46F.

As illustrated in FIG. 8B, the shock absorbing member 46B may be provided in such a manner that a thin plate bent along the inner circumferential surface 46K of the bearing case 46A is attached to the inner circumferential surface 46K. Alternatively, a flat thin plate may be provided in such a manner that the flat thin plate is attached to the inner circumferential surface 46K of the bearing case 46A, while being bent along the inner circumferential surface 46K.

The following well-known elastic members exemplify the material of the shock absorbing member 46B: synthetic resin (elastic resin) such as polyurethane or polystyrene, natural rubber, or the like. The provision of the shock absorbing member 46B reduces an impact when the second bearing 45B moving in the preload direction (to be described later) is brought into contact with the inner circumferential surface 46K.

Here, as illustrated in FIG. 8A, the shock absorbing members 46B are respectively provided along portions in the circumferential direction of the inner circumferential surface 46K of the main body 46F. Specifically, the shock absorbing members 46B are respectively provided in the circumferential direction of the inner circumferential surface 46K at a plurality of locations (two locations) that face each other while interposing the spring pass-through hole 46M (the coil spring 46D). In more detail, the shock absorbing members 46B are provided upstream in the preload direction (to be described later, refer to arrow B) of the inner circumferential surface 46K. In other words, the shock absorbing members 46B are provided on the inner circumferential surface 46K so as to respectively face the protruding pieces 46H and 46I. In addition, the shock absorbing members 46B are respectively provided at locations at which the second bearing 45B moves in an opposite direction of the one direction, and is brought into contact with the inner circumferential surface 46K.

The shock absorbing members 46B are respectively not provided on the guiding surfaces 46L, but are respectively provided upstream in the preload direction of the guiding surfaces 46L. Accordingly, the shock absorbing members 46B do not block the movement of the second bearing 45B in the preload direction.

Here, as illustrated in FIG. 6, a thickness (a radial length) 46T of the shock absorbing member 46B implies a dimension by which the shock absorbing member 46B separates from an outer circumferential surface of the second bearing 45B that is biased in the preload direction (to be described later, refer to arrow B), and is brought into contact with the inner circumferential surface 46K. In other words, the thickness 46T of the shock absorbing member 46B implies a dimension by which the second bearing 45B is allowed to move in the preload direction without contact with the shock absorbing member 46B.

The inner diameter of the cylindrical member (a seat rubber) 46C is set to allow the coil spring 46D to be inserted thereinto. The cylindrical member 46C supports an outer circumferential surface of the elastically deforming coil spring 46D via an inner circumferential surface of the cylindrical member 46C.

The coil spring 46D is loaded between the outer circumferential surface of the second bearing 45B and an end surface of the cap 46E, in a state of being compressed therebetween.

The cap 46E is a substantially disc-shaped member, and a male screw is formed on an outer circumferential surface of the cap 46E. The male screw of the cap 46E is screwed into a female screw formed in an annular concave portion 31F (to be described later), and thus the cap 46E is fixed with respect to the first outer circumferential portion 31A.

Hereinafter, the following point is not described above. The first outer circumferential portion 31A includes an accommodating space 31D that is a substantially columnar space for accommodating the bearing case 46A, and has an inner diameter smaller than the outer diameter of the bearing case 46A in a free load state; a pass-through hole 31E into which the cylindrical protruding portion 46G is inserted, and connects the accommodating space 31D to an outside of the first outer circumferential portion 31A; and the annular concave portion 31F that is provided in an opening of the pass-through hole 31E. The female screw is formed on an inner circumferential surface of the annular concave portion 31F.

Subsequently, an outline of procedures of assembling together the preload mechanism 46 will be described with reference to FIG. 6. First, the second bearing 45B is disposed inside the bearing case 46A in a free load state. The second bearing 45B and the main body 46F are disposed in the accommodating space 31D of the first outer circumferential portion 31A, while the cylindrical protruding portion 46G is being inserted into the pass-through hole 31E. At this time, the state of the bearing case 46A changes from a free load state to a diameter reduced state, and an outer circumference of the second bearing 45B is held (accommodated) by the inner circumferential surface 46K of the main body 46F.

Subsequently, the cylindrical member 46C is inserted into the spring pass-through hole 46M (refer to FIGS. 7A and 7B), and the coil spring 46D is inserted into the cylindrical member 46C. The cap 46E is screwed into the annular concave portion 31F, thereby fixing the cap 46E with respect to the first outer circumferential portion 31A. In a state where the cap 46E is fixed, one end of the coil spring 46D inserted into the cylindrical member 46C is loaded between the outer circumferential surface of the second bearing 45B and the cap 46E, in a state of being compressed therebetween.

In the preload mechanism 46 which is assembled as above, the second bearing 45B is pressed and biased to the worm wheel 43 (refer to FIG. 3) by the coil spring 46D (refer to arrow B). Accordingly, as illustrated in FIG. 3, the worm gear 42 is pushed against the worm wheel 43, and thus a preload is exerted on the meshing portion between the worm gear 42 and the worm wheel 43. The preload prevents backlash from occurring in the meshing portion between the worm gear 42 and the worm wheel 43.

The guiding surfaces 46L formed in the bearing case 46A enable the movement of the second bearing 45B along the preload direction, thereby maintaining an appropriate meshing position between the worm gear 42 and the worm wheel 43, and allowing a smooth radial movement of the worm gear 42 caused by a change in reaction to the meshing of the worm gear 42 and the worm wheel 43.

In a state where the bearing case 46A is disposed inside the accommodating space 31D, the guiding surfaces 46L of the bearing case 46A face each other, and extend along the preload direction (refer to arrow B). More specifically, the guiding surfaces 46L are substantially parallel with each other. Here, the term "the substantially parallel" refers to a range of angle in which the second bearing 45B is allowed to move along the preload direction.

The second bearing 45B is interposed between the guiding surfaces 46L in a direction intersecting (orthogonal to) the preload direction.

Operation of Shock Absorbing Member 46B

Figure 9A:
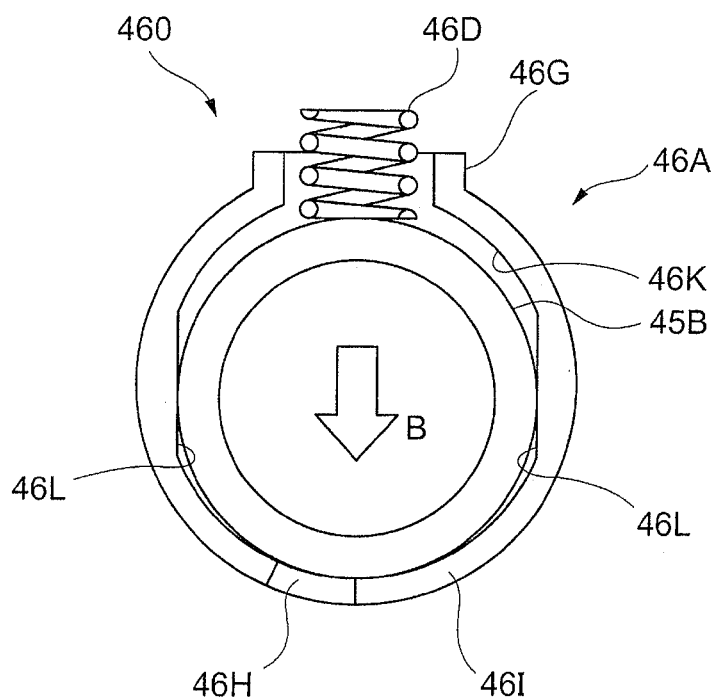
FIGS. 9A and 9B are views describing an operation of a preload mechanism without the shock absorbing members, different from the embodiment.
Figure 9B:
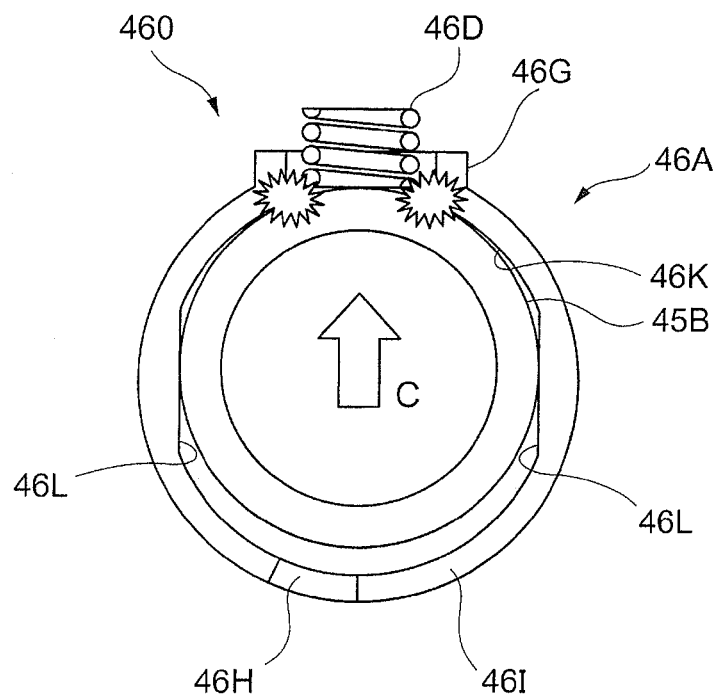

FIGS. 9A and 9B are views describing an operation of a preload mechanism 460 without the shock absorbing member 46B, different from the embodiment. The existence or the non-existence of the shock absorbing member 46B is a point of difference between the preload mechanism 460 illustrated in FIGS. 9A and 9B and the preload mechanism 46 of the embodiment (refer to FIG. 6). Functional members of the preload mechanism 460 illustrated in FIGS. 9A and 9B correspond to those of the preload mechanism 46 illustrated in FIG. 6. FIGS. 9A and 9B illustrate only main parts among the functional members of the preload mechanism 460, and a part of functional members is not illustrated.

Subsequently, an operation of the shock absorbing member 46B will be described with reference to FIGS. 6, 9A and 93.

First, as illustrated in FIGS. 9A and 9B, an operation of the preload mechanism 460 without the shock absorbing member 46B, different from the embodiment, will be described later. As illustrated in FIG. 9A, in a normal state, an elastic force of the coil spring 46D biases the second bearing 45B to the worm wheel 43 (in one direction, refer to arrow B in FIG. 9A). At this time, the second bearing 45B is in contact with the inner circumferential surface 46K opposite to the coil spring 46D.

Here, when the driver rapidly turns the steering wheel (not illustrated) while the vehicle equipped with the electric power steering apparatus 1 is travelling on a rough road, the preload mechanism 460 may receive an impact (an external force or a large input). As illustrated in FIG. 9B, depending on the direction of the large input, the second bearing 45B moves in a direction (an opposite direction of the one direction, refer to arrow C in FIG. 9B) in which the worm gear 42 separates from the worm wheel 43 along the guiding surfaces 46L, and thus the second bearing 45B collides with the inner circumferential surface 46K near the coil spring 46D. Due to the impact, noise may occur or vibration may be transmitted to the driver. In addition, the movement direction of second bearing 45B is regulated by the guiding surfaces 46L of the bearing case 46A, and when the second bearing 45B collides with the inner circumferential surface 46K near the coil spring 46D, a large impact can be generated.

In contrast, in the embodiment, the shock absorbing member 46B is provided in the preload mechanism 46. Accordingly, when the second bearing 45B collides with the inner circumferential surface 46K of the bearing case 46A, an impact load is reduced. In addition, an occurrence of noise is reduced, or less vibration is transmitted to the driver.

Modification Example of Shock Absorbing Member 46B

Figure 10A:
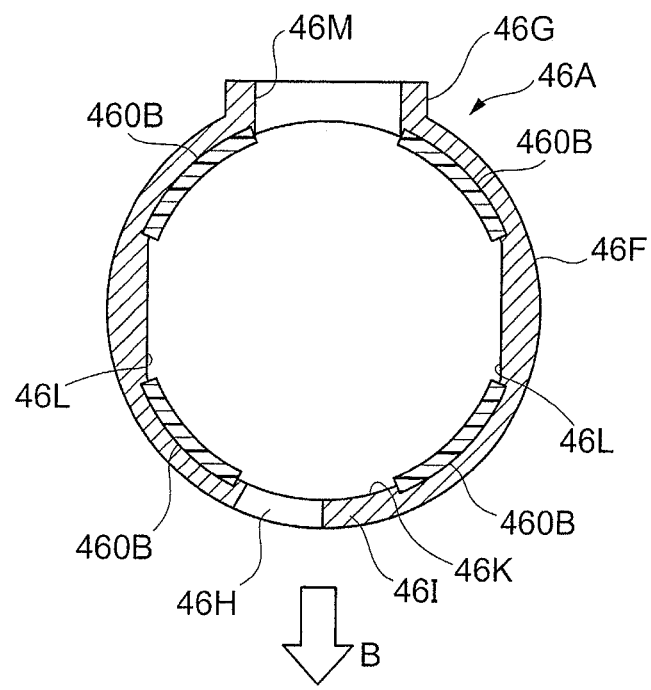
FIGS. 10A to 10C are views illustrating modification examples of the shock absorbing member.
Figure 10B:
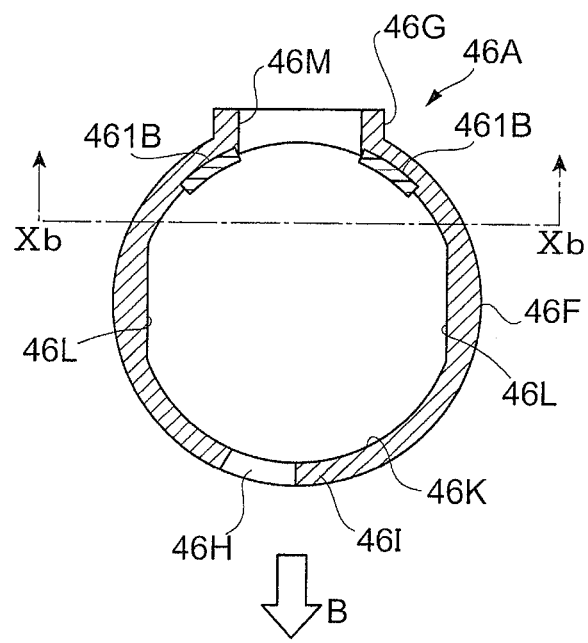
Figure 10C:
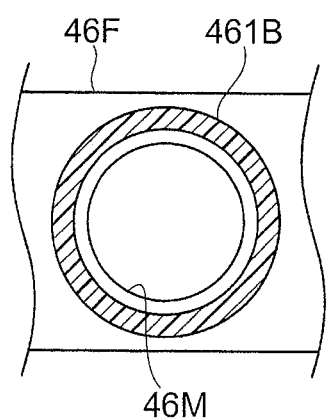

FIGS. 10A to 10C are views illustrating modification examples of the shock absorbing member 46B. Specifically, FIG. 10B is a front view of a shock absorbing member 461B, and FIG. 10C is a cross-sectional view of the shock absorbing member 461B illustrated in FIG. 10B, taken along line Xb-Xb.

FIGS. 11A to 11D are views illustrating modification examples of the shock absorbing member 46B.

In FIGS. 10A to 10C, and FIGS. 11A to 11D, the same reference signs are assigned to the same configuration members as those of the embodiment illustrated in FIGS. 8A and 8B, and the descriptions thereof will be omitted.

The modification examples of the shock absorbing member 46B will be described with reference to FIGS. 10A to 10C, and FIGS. 11A to 11D.

In the embodiment, the shock absorbing members 46B are provided on the inner circumferential surface 46K of the bearing case 46A at the two locations that interpose the spring pass-through hole 46M therebetween. However, insofar as the shock absorbing members 46B are provided around the spring pass-through hole 46M, the present invention is limited to that in the embodiment.

For example, as illustrated in FIG. 10A, shock absorbing members 460B may be provided on the inner circumferential surface 46K of the bearing case 46A at the two locations that interpose the spring pass-through hole 46M therebetween. In addition, the shock absorbing members 460B may be provided on the inner circumferential surface 46K of the bearing case 46A at two locations opposite to the spring pass-through hole 46M. As a result, the shock absorbing members 460B may be provided at a total of four locations. Here, in the circumferential direction of the bearing case 46A, the shock absorbing members 460B are respectively provided between the spring pass-through hole 46M and the guiding surfaces 46L, and are respectively provided between the guiding surface 46L and the protruding piece 46H, and between the guiding surface 46L and the protruding piece 46I.

Here, as illustrated in FIG. 10A, when, first, the second bearing 45B collides with the inner circumferential surface 46K near the coil spring 46D (upstream in the preload direction) due to a large input (refer to FIG. 6), then returns to its original position due to an elastic force of the coil spring 46D, and then is brought into contact with the inner circumferential surface 46K opposite to the coil spring 46D (downstream in the preload direction), the shock absorbing members 460B are provided on the inner circumferential surface 46K opposite to the spring pass-through hole 46M of the bearing case 46A, thereby reducing an impact. The configuration illustrated in FIG. 10A can be construed as a configuration in which another shock absorbing mechanism is provided at the location at which the second bearing 45B moves in the one direction and is brought into contact with the inner circumferential surface 46K.

As illustrated in FIGS. 10B and 10C, the shock absorbing member 461B may be provided in the inner circumferential surface 46K so as to surround an outer circumference of the spring pass-through hole 46M. In the example illustrated, the shock absorbing member 461B is a substantially annular member.

The following point is not described. The shock absorbing member 46B may be provided at one location in the circumferential direction.

The shape of the shock absorbing member 46B is not limited to the shape illustrated in FIG. 8B. For example, as illustrated in FIG. 11A, a plurality of shock absorbing members 462B may be provided in the circumferential direction of the second bearing 45B (refer to FIG. 6), and each of the shock absorbing members 462B may be made of a plate-like member having a narrow width, a longitudinal direction of which extends along the axial direction of the second bearing 45B.

Figure 11A:
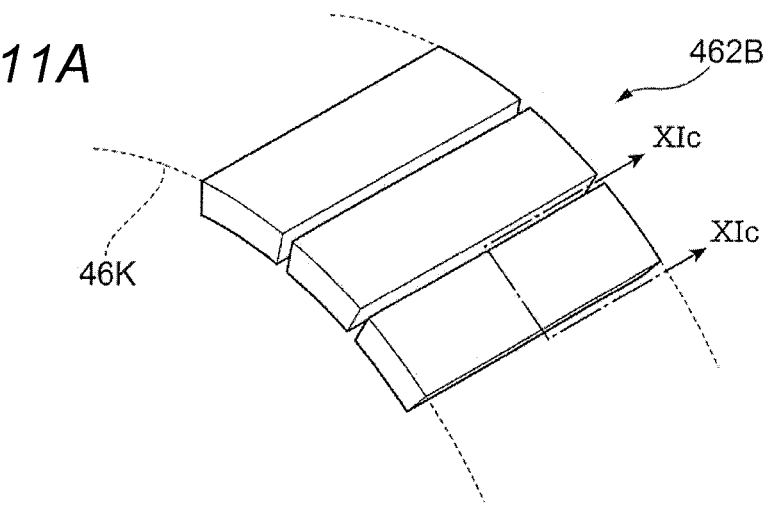
FIGS. 11A to 11D are views illustrating modification examples of the shock absorbing member.
Figure 11B:
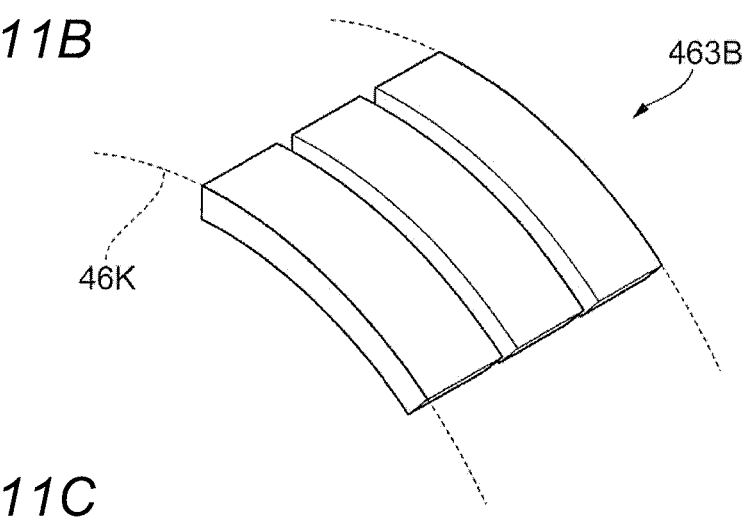

Alternatively, as illustrated in FIG. 11B, a plurality of shock absorbing members 463B may be provided in the axial direction of the second bearing 45B, and each of the shock absorbing members 463B may be made of a plate-like member having a narrow width, a longitudinal direction of which extends along the circumferential direction of the second bearing 45B.

The cross-sectional shape of the shock absorbing member 46B is not particularly limited. For example, as in the thin plate-like member illustrated in FIG. 8B, the shock absorbing member 46B may have a substantially rectangular cross-sectional shape.

Figure 11C:
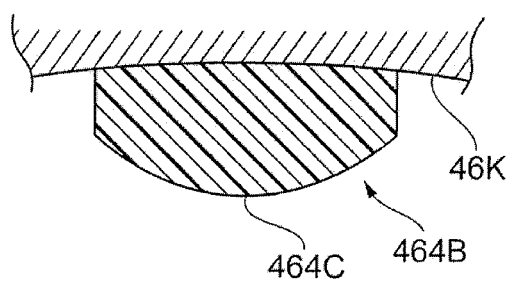

Alternatively, as illustrated in FIG. 11C, a shock absorbing member 464B may have a protruding portion 464C, the cross-sectional shape of which protrudes to the center (downwards in FIG. 11C) of the bearing case 46A, when taken along line XIC-XIC in FIG. 11A.

Figure 11D:
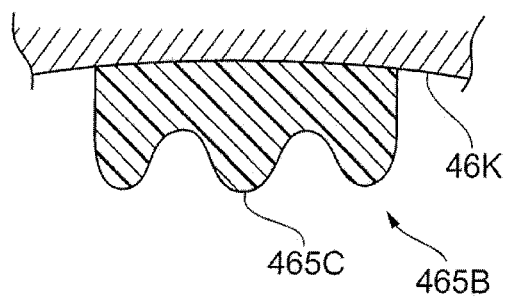

Alternatively, as illustrated in FIG. 11D, a shock absorbing member 465B may have a plurality of protruding portions 465C which are continuously formed, and the cross-sectional shape of each of which protrudes to the center (downwards in FIG. 11D) of the bearing case 46A (refer to FIGS. 10A to 10C).

Here, for example, since the shock absorbing member 464B has the protruding portion that protrudes to the center of the bearing case 46A, when the second bearing 45B collides with the shock absorbing member 464B, first, the shock absorbing member 464B receives a load via a tip portion of the protruding portion 464C, and receives the load via a greater surface as the second bearing 45B moves further, thereby suppressing an impact when the second bearing 45B begins to collide with (contact) the shock absorbing member 464B, and ensuring a sufficient pressing force to prevent the movement of the second bearing 45.

Each of the shock absorbing member 46B, 460B to 465B is preferably provided on the inner circumferential surface 46K of the bearing case 46A. Accordingly, each of the shock absorbing member 46B, 460B to 465B may be fixed onto the inner circumferential surface 46K of the bearing case 46A by using an adhesive. Alternatively, each of the shock absorbing member 46B, 460B, and 465B may be formed on the inner circumferential surface 46K of the bearing case 46A by coating or vapor deposition.

According to the above description, each of the shock absorbing member 46B, 460B to 465B is a substantially plate-like member having a large elastic force. However, the present invention is not limited to the member in each of the embodiments, and for example, each of the shock absorbing member 46B, 460B to 465B may be made of a spring member such as a leaf spring or a coil spring.

The present invention is not limited to the configuration in which the bearing case 46A includes separate members provided at respective locations at which the second bearing 45B moves along the preload direction, and is brought into contact with the bearing case 46A. The bearing case 46A may have contacting portions, each of which itself is made of a member having an elastic force greater than that of other portions. Alternatively, the present invention may be configured in such a manner that the second bearing 45B and the contacting portions are respectively provided with magnets, and the facing magnets are set to have the same polarity, and thus the second bearing 45B and the contacting portions repel each other due to a magnetic force.

According to the above description, the main body 46F of the bearing case 46A is a substantially annular body having a substantially C shape, a portion of which is cut separate at a circumferential location. However, the main body 46F may be a substantially annular body that is continuously formed without a cut separate portion in the circumferential direction.

According to the above description, the shock absorbing member 46B is provided on the inner circumferential surface 46K of the bearing case 46A. In this configuration, the shock absorbing member 46B may protrude radially inwards further than other portions of the inner circumferential surface 46K of the bearing case 46A.

However, the present invention is not limited to this configuration, and for example, may have a configuration in which concave portions are respectively formed in the inner circumferential surface 46K at the provision locations of the shock absorbing members 46B so as to have a depth corresponding to the thickness of the shock absorbing member 46B, and the shock absorbing members 46B are respectively disposed in the concave portions. That is, an inner circumferential surface of the shock absorbing member 46B is flush with other portions of the inner circumferential surface 46K of the bearing case 46A.

According to the above description, the modification examples are configured in various forms, but the modifications may be combined together.

The disclosure is not limited to any one of the embodiments, and can be implemented in various forms insofar as the forms do not depart from the scope of the disclosure.

What is claimed is:
1. A power steering apparatus comprising:
a worm gear that receives a drive force to rotate;
a worm wheel that is connected to the worm gear;
a bearing portion that rotatably supports the worm gear;
a biasing portion that biases the bearing portion in one direction to push the worm gear against the worm wheel;
a supporting portion that supports the bearing portion, and guides a movement of the bearing portion along the one direction; and
a shock absorbing mechanism that is provided at a location,
wherein the bearing portion moves in an opposite direction of the one direction to be brought into contact with the shock absorbing mechanism at the location.

2. The power steering apparatus according to claim 1,
wherein the supporting portion has a guiding surface that is a surface formed along the one direction, and that guides the movement of the bearing portion along the one direction, and
the shock absorbing mechanism has an elastic member having a modulus of elasticity greater than that of a part of the supporting portion forming the guiding surface.

3. The power steering apparatus according to claim 2,
wherein the shock absorbing mechanism is provided at a location other than a location at which the guiding surface is provided in the supporting portion.

4. The power steering apparatus according to claim 1, further comprising:
another shock absorbing mechanism that is provided at another location,
wherein the shock absorbing mechanism and said another shock absorbing mechanism are respectively provided at positions in a circumferential direction of the bearing portion, which face each other while interposing the biasing portion therebetween.

5. The power steering apparatus according to claim 1,
wherein another shock absorbing mechanism is provided at another location,
the bearing portion moves in the one direction to be brought into contact with said another shock absorbing mechanism at said another location.

6. The power steering apparatus according to claim 1,
wherein the supporting portion has a cylindrical member, a portion of which is cut separate at a circumferential location opposite to the biasing portion, while a center of the bearing portion is interposed between the cut separate portion and the biasing portion, and
the shock absorbing mechanism is provided at a location other than a location at which the cut separate portion of the supporting portion is positioned.

* * * * *